US008733696B2

(12) United States Patent
Tanguy

(10) Patent No.: US 8,733,696 B2
(45) Date of Patent: May 27, 2014

(54) METHOD FOR ENHANCING THE AERODYNAMIC EFFICIENCY OF THE VERTICAL TAIL OF AN AIRCRAFT

(75) Inventor: Alain Tanguy, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 346 days.

(21) Appl. No.: 13/319,381

(22) PCT Filed: May 17, 2010

(86) PCT No.: PCT/FR2010/050943
§ 371 (c)(1),
(2), (4) Date: Nov. 8, 2011

(87) PCT Pub. No.: WO2010/133789
PCT Pub. Date: Nov. 25, 2010

(65) Prior Publication Data
US 2012/0048995 A1 Mar. 1, 2012

(30) Foreign Application Priority Data
May 20, 2009 (FR) ........................................ 0902466

(51) Int. Cl.
*B64C 9/02* (2006.01)
(52) U.S. Cl.
USPC ............................................ 244/87; 244/130
(58) Field of Classification Search
USPC ..................... 244/1 R, 87, 88, 91, 130, 129.1
See application file for complete search history.

(56) References Cited

U.S. PATENT DOCUMENTS

| 2,070,809 | A | * | 2/1937 | Root ............................... 244/87 |
| 2,356,139 | A | | 8/1944 | Edmund et al. |
| 5,375,794 | A | * | 12/1994 | Bleeg ........................... 244/76 C |
| 5,692,704 | A | * | 12/1997 | Buttgereit et al. ............ 244/119 |
| 7,896,289 | B2 | * | 3/2011 | Verde Preckler et al. ........ 244/91 |
| 7,913,949 | B2 | * | 3/2011 | Hoffenberg ..................... 244/87 |
| 8,038,093 | B2 | * | 10/2011 | Llamas Sandin et al. ...... 244/87 |
| 8,342,446 | B2 | * | 1/2013 | Chareyre et al. ................ 244/87 |
| 2009/0026311 | A1 | * | 1/2009 | Verde Preckler et al. ........ 244/91 |
| 2009/0159755 | A1 | * | 6/2009 | Gonzalez Gozalbo et al. ............................ 244/215 |
| 2009/0256025 | A1 | * | 10/2009 | Verde Preckler et al. ........ 244/87 |
| 2010/0032519 | A1 | * | 2/2010 | Chareyre et al. ................ 244/87 |
| 2012/0048995 | A1 | * | 3/2012 | Tanguy ........................... 244/87 |

(Continued)

FOREIGN PATENT DOCUMENTS

| EP | 0887256 | 12/1998 |
| WO | 0007875 | 2/2000 |

OTHER PUBLICATIONS

European Patent Office, International Search Report PCT/FR2010/050943, Aug. 4, 2010 (2 pgs), Form PCT/ISA/237 (6 pgs.) English language translation of Form PCT/ISA/237 (7 pgs).

*Primary Examiner* — Benjamin P Lee
(74) *Attorney, Agent, or Firm* — Wood, Herron & Evans, LLP

(57) ABSTRACT

A method for enhancing aerodynamic efficiency of a vertical tail includes varying the ratio between the control surface local chord and the vertical stabilizer local chord along the height of the vertical tail. This variation is configured to adapt the local value of the coefficient of the side lift applied to the vertical tail to a maximum acceptable value of the side lift coefficient. As a result, the aerodynamic efficiency is maximized by applying a coefficient approaching the maximum acceptable side lift coefficient.

9 Claims, 3 Drawing Sheets

(56) References Cited

U.S. PATENT DOCUMENTS

2012/0091266 A1* 4/2012 Whalen et al. .................. 244/87
2012/0256047 A1* 10/2012 Tanguy .......................... 244/87
2013/0320137 A1* 12/2013 Maenz ........................... 244/87

* cited by examiner

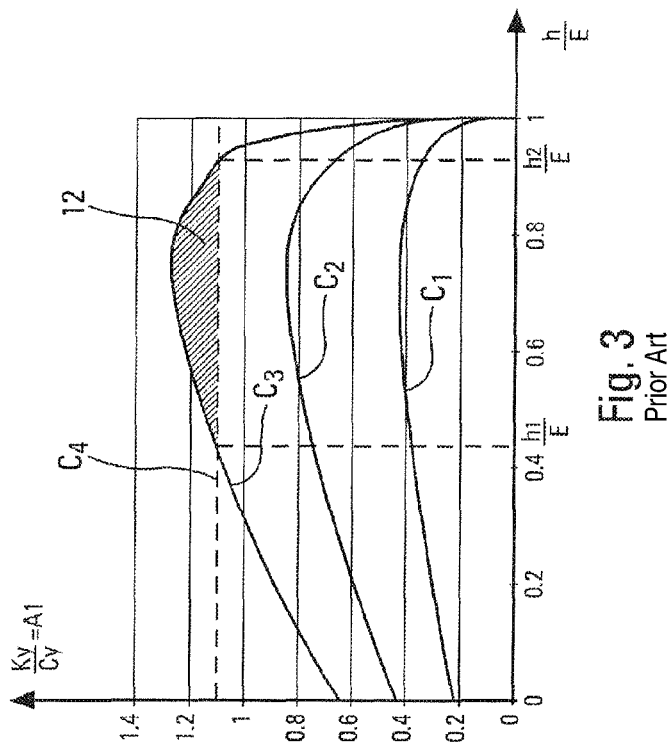
Fig. 2
Prior Art
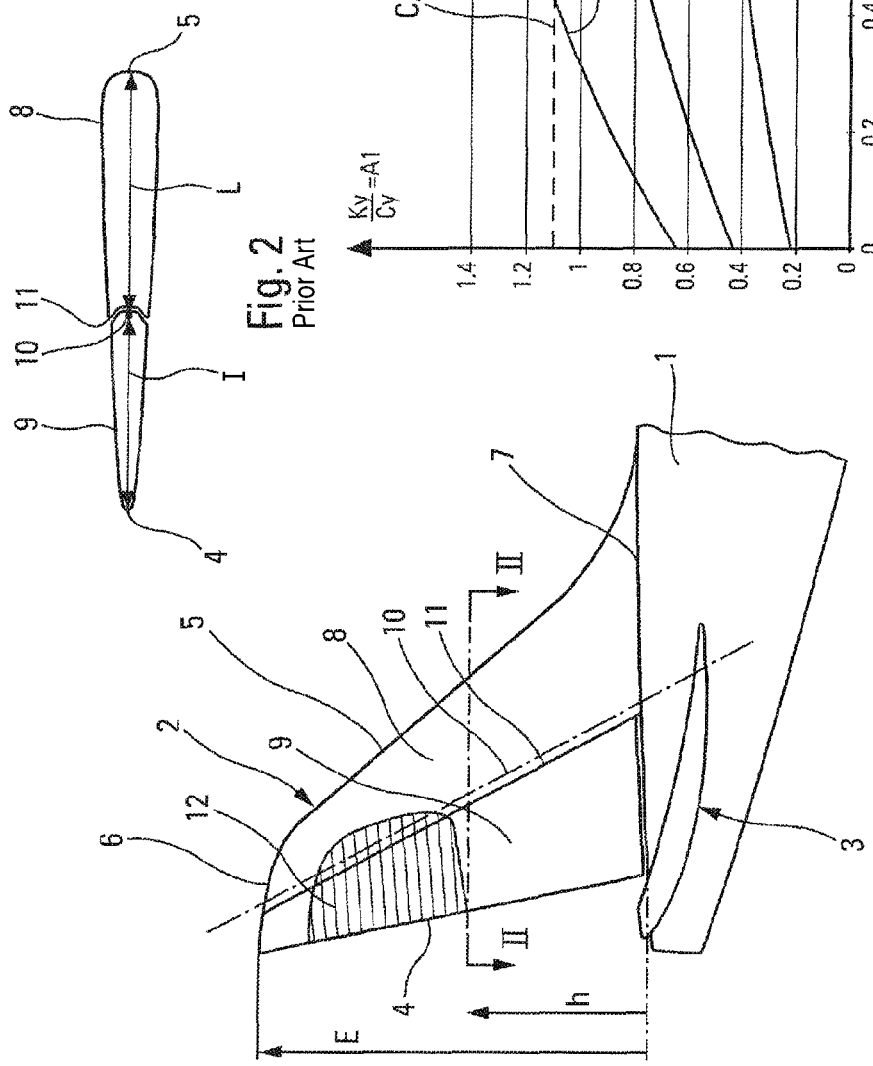
Fig. 3
Prior Art
Fig. 1
Prior Art

METHOD FOR ENHANCING THE AERODYNAMIC EFFICIENCY OF THE VERTICAL TAIL OF AN AIRCRAFT

This application claims priority, under Section 371 and/or as a continuation under Section 120, to PCT Application No. PCT/FR2010/050943, filed on May 17, 2010, which claims priority to French Application No. 0902466, filed on May 20, 2009.

TECHNICAL FIELD

The present invention relates to a method for enhancing the aerodynamic efficiency of the vertical tail of an aircraft, as well as a vertical tail implementing such a method, and an aircraft comprising such a vertical tail.

The method is adapted for any type of aircraft and in particular for airplanes having their engines carried by airfoils.

BACKGROUND

It is known that the vertical tail of as aircraft is able to generate, as a result of the surface thereof, a side lift and an aerodynamic drag, and that it should impart to said aircraft the stability, the maneuverability and the balancing for every flight condition.

The surface of the vertical tail is sized so as to be able to compensate for the yaw effect created as a result of the breakdown of one of the engines of the aircraft, allowing to impart to the aircraft a sufficiently low minimum control speed should an engine breakdown, for meeting the take-off and landing performance of the aircraft. The dimensions of such a vertical tail are calculated at a low sideslip rate of the aircraft, for a control surface having, with respect to the stabilizer of the vertical tail, a maximum angular position.

Furthermore, it is known:
from U.S. Pat. No. 2,356,139, a method for enhancing the aerodynamic efficiency of a vertical tail of an aircraft, comprising a vertical stabilizer and a control surface able to rotate with respect to such vertical stabilizer. To this end, said stabilizer is enlarged with an additional back stabilizer, the length of said additional stabilizer being higher than the height at which it meets the existing stabilizer. The aim of this additional stabilizer is to enhance a coefficient indicating the yaw torque produced by the whole vertical tail as a function of the angle of yaw of the aircraft;
from EP-0,887,256, a vertical tail of an aircraft comprising, more particularly, a vertical stabilizer, a control surface comprising two sections, and a spoiler; and
from document WO-00/07875, a vertical tail of an aircraft, being provided with a plate at the upper end thereof.

The aim of the invention is to increase the side lift of the vertical tail or to maintain the same side lift while decreasing the surface of the vertical tail. To this end, it provides a method allowing to enhance the local aerodynamic efficiency of the vertical tail throughout the height of the vertical tail, that is to bring the local value of the side lift coefficient closer to of the maximum acceptable value of the side lift coefficient beyond which there is a detachment of the air layer on the surface of the vertical tail.

SUMMARY OF THE INVENTION

To this end, according to the invention, the method for enhancing the aerodynamic efficiency of the vertical tail of an aircraft comprising a vertical stabilizer and a control surface able to rotate with respect to said stabilizer around a hinge axis, is remarkable in that the ratio between the control surface local chord and the vertical stabilizer local chord is varied along the height of the vertical tail in order to adapt the local value of the side lift coefficient applied to the vertical tail to a maximum acceptable value, the control surface local chord being the distance between the trailing edge of the control surface and the hinge axis and the vertical stabilizer local chord being the distance between the hinge axis and the leading edge of the stabilizer.

Advantageously, the maximum acceptable value of the side lift coefficient is the value beyond which, for a given angle between the control surface and the stabilizer, a detachment of the aerodynamic flow is observed on the surface of the vertical tail.

Furthermore, the variable ratio is determined between the control surface local chord and the vertical stabilizer local chord as a function of the local value of the side lift coefficient calculated with an angle of the control surface, with respect to the stabilizer, for which a detachment is observed of the aerodynamic flow on the surface of the vertical tail.

The ratio between the control surface local chord and the vertical stabilizer local chord is increased compared to a control surface local chord/vertical stabilizer local chord constant ratio, in the vicinity of the root of the vertical tail, and the constant ratio is decreased between the control surface local chord and the vertical stabilizer local chord compared to the ratio between the control surface local chord and the vertical stabilizer local chord, in the vicinity of the tip of the vertical tail.

In a first embodiment, the method allows to improve a generally trapezoid-shaped vertical tail, having a rectilinear trailing edge of the control surface and a hinge axis and for which the ratio between the control surface local chord and the vertical stabilizer local chord is constant, the improvement consisting in rotating the hinge axis in a given position, by an angle oriented so as to increase the ratio between the control surface local chord and the vertical stabilizer local chord in the vicinity of the root and to decrease the ratio between the control surface local chord and the vertical stabilizer local chord in the vicinity of the tip.

In a second embodiment, the vertical tail is achieved so that the ratio between the control surface local chord and the vertical stabilizer local chord allows a local value of the side lift coefficient, either constant or lower than or equal to the maximum acceptable value, along the height of the vertical tail, between the root and a given height of the vertical stabilizer, and a decreasing local value of the side lift coefficient between the given height of the vertical stabilizer and the tip.

In this second embodiment, the method can improve a generally trapezoid-shaped vertical tail and having a rectilinear trailing edge of the control surface and a hinge axis for which the ratio between the control surface local chord and the vertical stabilizer local chord is constant, the improvement consisting in rotating the hinge axis in a given position, by an angle oriented so as to increase the ratio between the control surface local chord and the vertical stabilizer local chord in the vicinity of the root and to (Decrease the ratio between the control surface local chord and the vertical stabilizer local chord in the vicinity of the tip, and giving to the trailing edge of the control surface a concave curved shape.

Preferably, the control surface is pivoted around the hinge axis by an angle ranging from 0 to 45° with respect to the vertical stabilizer for determining the varying ratio between the control surface local chord and the vertical stabilizer local chord.

Obviously, it results from the foregoing that the present invention also relates to a vertical tail implementing the previously described method, and an aircraft comprising such a vertical tail.

BRIEF DESCRIPTION OF DRAWINGS

The FIGS. of the appended drawings will better explain how this invention can be implemented. In these FIGS., like reference numerals relate to like components.

FIG. 1 schematically shows the tail of the fuselage of an aircraft with a vertical tail of the state of the art.

FIG. 2 is an enlarged section view, along the line II-II of FIG. 1, of the vertical tail.

FIG. 3 shows a plot for the evolution of the ratio A1 between the local value of the side lift coefficient Ky and the constant value of the side lift coefficient Cy calculated for a minimum control speed, as a function of the height, relatively to the span, of the vertical tail of FIG. 1.

DETAILED DESCRIPTION

Figure 4:
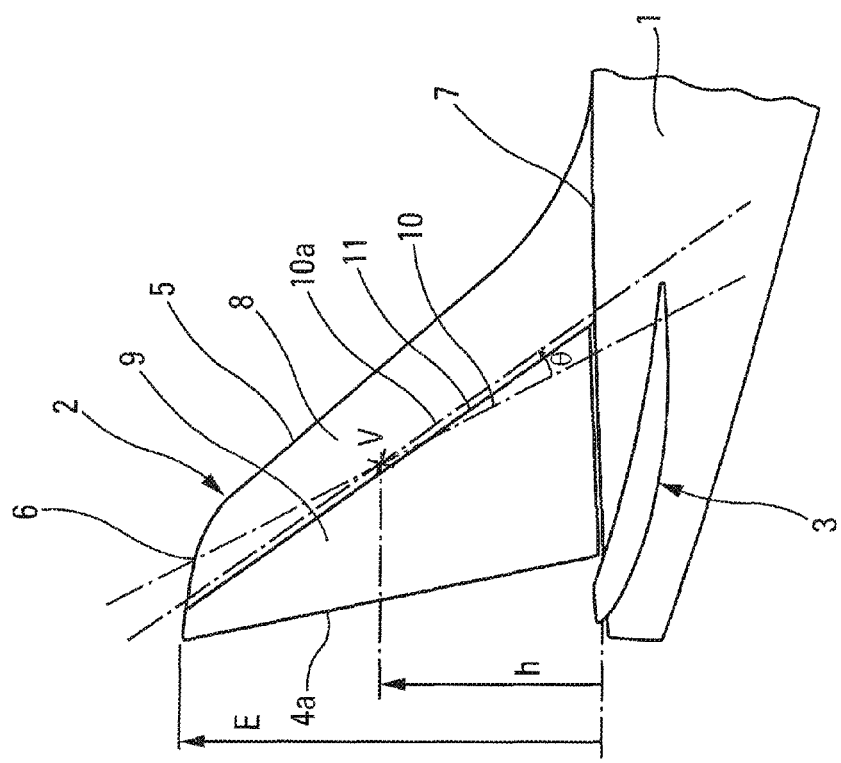
FIG. 4 illustrates a first embodiment of the vertical tail according to this invention.
Figure 6:
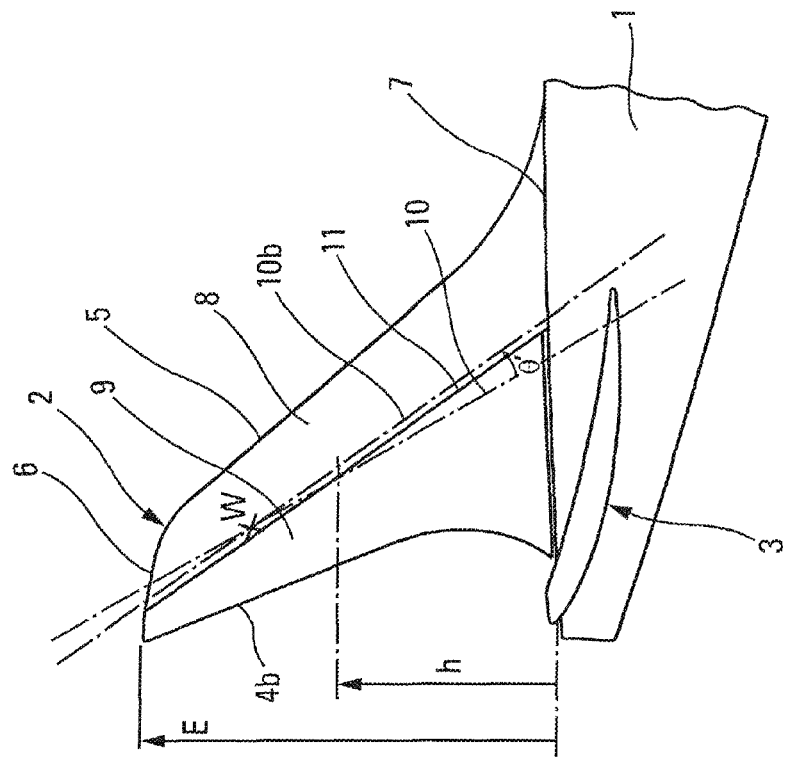
FIG. 6 illustrates a second embodiment of the vertical tail according to this invention.

The tail 1 of the fuselage of the aircraft, shown on FIGS. 1, 4 and 6, carries a substantially trapezoid-shaped vertical tail 2 and a horizontal tail 3.

The vertical tail 2 is bounded by a trailing edge 4, a leading edge 5, an upper end or tip 6 and a lower end or root 7. The vertical tail 2 comprises a vertical stabilizer 8 and a control surface 9 hinged to the vertical stabilizer 8 via a hinge axis 10 slightly ahead of the back end edges 11 of the vertical stabilizer 8. The span of the vertical tail 2 between the tip 6 and the root 7 is referred to as E.

At a height h of the vertical tail 2 corresponding to the distance from the line II-II to the root 7, there are considered the control surface local chord I being the distance between the trailing edge 4 and the hinge axis 10, and the vertical stabilizer local chord L being the distance between the hinge axis 10 and the leading edge 5, as illustrated on FIG. 2.

In the state of the art described on FIGS. 1 to 3, the I/L ratio is constant whatever the height h.

On the plot of FIG. 3, three curves C1, C2 and C3 are shown, in a bell shape each corresponding to the evolution of the previously defined ratio A1 as a function of the height h relatively to the span E, for three different angles of the control surface 9 with respect to the vertical stabilizer 8. A horizontal right line C4 corresponds to the maximum ratio A1 beyond which a detachment 12 of the air flow on the vertical tail 2 is observed.

As can be seen, for each curve C1, C2 and C3, the ratio A1 increases up to a limit height, and subsequently decreases down to becoming nil at the span E. The limit height is located closer to the tip 6 than to the root 7, as the air flow is submitted the most to aerodynamic disturbances on this part of the vertical tail 2.

The angle of the control surface 9 with respect to the Vertical stabilizer 8 is 10°, 20°, 45°, respectively for the curves C1, C2 and C3. The ratio A1 of the three curves C1, C2 and C3 is proportional to the angle of the control surface 9. Therefore, whatever the height h relatively to the span E, the curve C3 is above the curve C2 being in turn above the curve C1.

The position of the two curves C1 and C2 under the right line C4 for any height h comprised within the range [0, E], illustrates that, for angles of 10° and 20°, the local side lift of the vertical tail 2 is lower than the maximum acceptable side lift without any detachment of the air layer, whatever the height h.

The curve C3 is under the right line C4 for a height h being comprised in the ranges [0, h1] and [h2, E], and is above the right line C4 for a height h being comprised in the range [h1, h2]

In other words, for the angle of 45°, the local side lift of the vertical tail 2 is:
  lower than the maximum side lift for a height h comprised in the ranges [0, h1] and [h2, E];
  higher than the maximum side lift for a height h comprised within the range [h1, h2].

The deviations between the local side lift of the vertical tail 2 and the maximum side lift indicate that the I/L ratio being constant in the state of the art, whatever the height h, is not adapted.

The invention consists in varying the I/L ratio for bringing the ratio A1 of the curves C1, C2 and C3, from now on designated as C'1, C'2 aid C'3, closer to the maximum ratio A1 of the right line C4.

Figure 5:
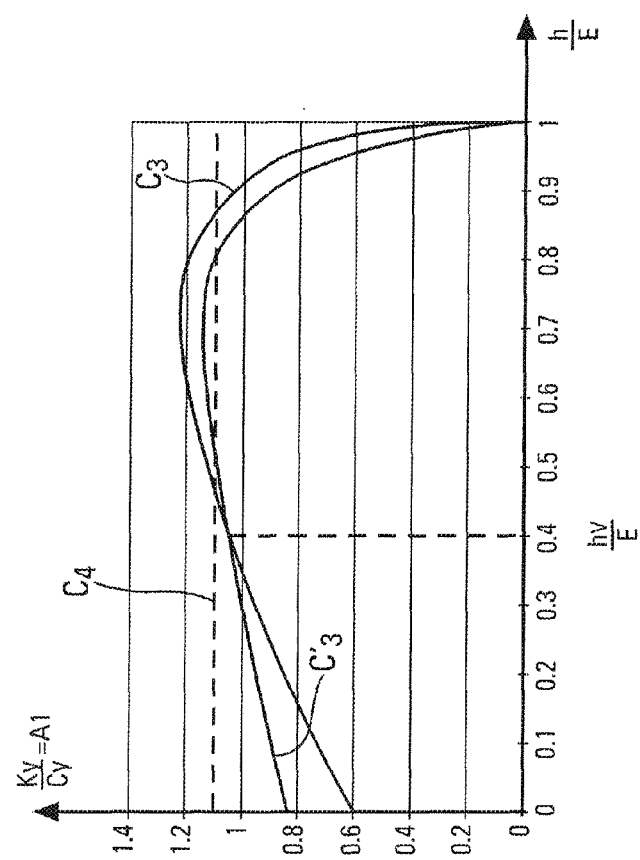
FIG. 5 shows a plot for the evolution of the ratio A1 as a function of the height, relatively to the span, of the vertical tail of FIG. 4.
Figure 7:
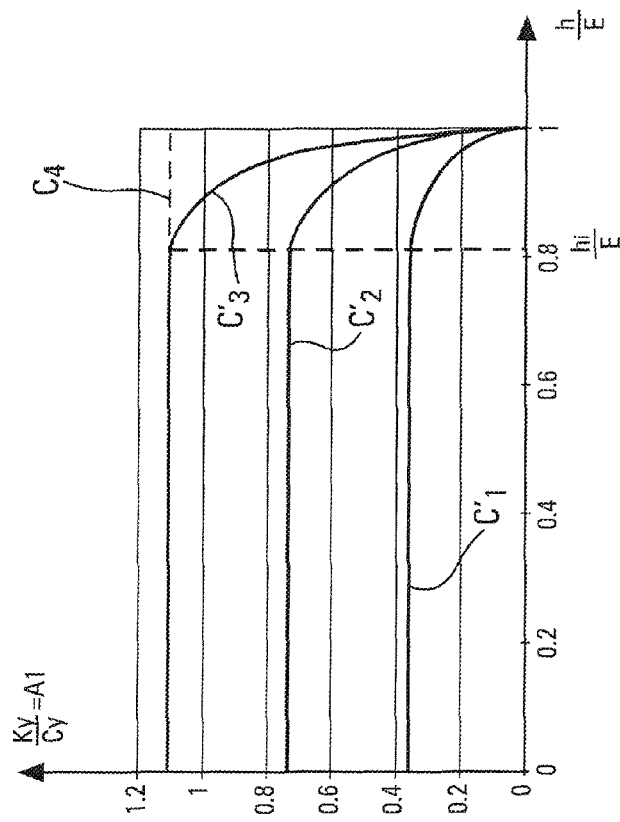
FIG. 7 shows a plot for the evolution of the ratio A1 as a function of the height, relatively to the span, of the vertical tail of FIG. 6.

The varying I/L ratio is determined as a function of the ratio A1 calculated for an angle of the control surface 9, with respect to the vertical stabilizer 8, resulting in a detachment 12, corresponding to the curve C'3 on FIGS. 5 and 7. For instance, such an angle is 45°.

A first embodiment of the vertical tail 2 according to the invention and the plot for the evolution of the ratio A1 of the curve C'3 as a function of the height h, relatively to the span E, are respectively shown on FIGS. 4 and 5.

In this first embodiment, the trailing edge 4a of the control surface 9 corresponds to the rectilinear trailing edge 4 of the vertical tail 2 of FIG. 1. The hinge axis 10a has pivoted around a point V, with respect to the hinge axis 10 of FIG. 1, by an angle θ oriented in the anti-clockwise direction.

The varying I/L ratio is increased with respect to the constant I/L ratio, in the vicinity of the root 7, whatever the height h comprised within the range [0, hv], so as to allow to increase the ratio A1 of the curve C'3, comparatively to the ratio A1 of the curve C3, in the vicinity of the root 7. It is decreased with respect to the constant I/L ratio in the vicinity of the tip 6, whatever the height h comprised within the range [hv, E], so as to allow to decrease the ratio A1 of the curve C' 3, with respect to the ratio A1 of the curve C3, in the vicinity of the tip 6. It is equal to the constant I/L ratio for hv, the ratio A1 of the curve C'3 being equal to the ratio A1 of the curve C3.

Therefore, the absolute value of the maximum difference C'3(h)−A1 is lower than the absolute value of the maximum difference C3(h)−A1 for any height h of the vertical tail 2. The local value of the side lift coefficient Ky of the curve C'3 is therefore brought closer to the value of the maximum side lift coefficient Ky of the right line C4, for any height h, the value of the side lift coefficient Cy being a constant value.

A second embodiment of the vertical tail 2 according to the invention and the plot for the evolution of the ratio A1 of the curve C'3 as a function of the height h, relatively to the span E, are respectively shown on FIGS. 6 and 7.

In this second embodiment, the trailing edge 4b of the control surface 9 has a concave curved shape. It could have another concave shape that is not curved. The hinge axis 10b is pivoted around a point W, with respect to the hinge axis 10 of FIG. 1, by an angle θ' oriented in the anti-clockwise direction.

The varying l/L ratio is determined so that the ratio A1 of the curve C'3 is equal to the maximum ratio A1 for any height h comprised within the range [0, hi], and decreases within the range [hi, b].

The values A1 of the curves C'1 and C'2, being calculated with the determined varying l/L ratio and for angles of 10° and 20°, are two constant values being lower than the maximum ratio A1 for a height h comprised within the range [0, hi], and decrease for a height h comprised within the range [hi, E].

For each one of the three curves C1, C'2 and C'3, the absolute value of the maximum difference C'3(h)−A1 integrated onto the height h describing the range [0, E], is lower than the absolute value of the maximum difference C3(h)−A1 integrated onto the height h describing the range [0, E]. The local value of the side lift coefficient Ky of the curves C'1, C'2 and C'3 is thus brought closer on average to the value of the maximum side lift coefficient Ky of the right line C4, the value of the side lift coefficient Cy being a constant value.

The second embodiment is advantageous in that it decreases the size of the vertical tail and thereby, the drag applied to it, comparatively to the first embodiment, while optimizing bringing the local value of the side lift coefficient closer to the maximum acceptable value.

Alternatively, it would be possible to modify the leading edge instead of the trailing edge, or to modify both of them, so as to bring closer or to match the ratio A1 of the curve C'3 and the maximum ratio A1 of the right line C4.

Thus, both embodiments allow the local value of the side lift coefficient to be brought closer to the maximum acceptable value of the side lift coefficient. Moreover, advantageously, they allow the bending stresses resulting from the angular positions of the control surface with respect to the vertical stabilizer to be lower than those resulting from the configuration of the vertical tail of the state of the art, as the side lift applied to the vertical tail is more distributed toward the root than toward the tip. It result therefrom that significant mass gains are achieved for implementing the vertical tail of the aircraft.

The invention claimed is:

1. A method for enhancing the aerodynamic efficiency of a vertical tail of an aircraft comprising a vertical stabilizer and a control surface able to pivot with respect to said vertical stabilizer around a hinge axis, the method comprising:

varying the ratio between a control surface local chord and a vertical stabilizer local chord as a function of a height of the vertical tail so as to bring a local value of the side lift coefficient applied to the vertical tail closer to a maximum acceptable value, the control surface local chord being the distance between a trailing edge of the control surface and the hinge axis and the vertical stabilizer local chord being the distance between the hinge axis and a leading edge of the vertical stabilizer, wherein the maximum acceptable value of the side lift coefficient is the value beyond which, for a given angle between the control surface and the vertical stabilizer, a detachment of the aerodynamic flow is observed on the surface of the vertical tail.

2. The method according to claim 1, wherein the varying ratio is determined between the control surface local chord and the vertical stabilizer local chord as a function of the local value of the side lift coefficient calculated with an angle of the control surface with respect to the vertical stabilizer for which a detachment is observed of the aerodynamic flow on the surface of the vertical tail.

3. The method according to claim 2, wherein the ratio between the control surface local chord and the vertical stabilizer local chord is increased comparatively to a constant ratio between the control surface local chord and the vertical stabilizer local chord, in the vicinity of a root of the vertical tail, and the ratio between the control surface local chord and the vertical stabilizer local chord is decreased comparatively to the constant ratio between the control surface local chord and the vertical stabilizer local chord, in the vicinity of a tip of the vertical tail.

4. The method according to claim 3, applied to a generally trapezoid-shaped vertical tail having a rectilinear trailing edge of the control surface and a hinge axis and for which the ratio between the control surface local chord and the vertical stabilizer local chord is constant, wherein the hinge axis is pivoted in a given position, by an angle oriented so as to increase the ratio between the control surface local chord and the vertical stabilizer local chord in the vicinity of the root and to decrease the ratio between the control surface local chord and the vertical stabilizer local chord in the vicinity of the tip.

5. The method according to claim 3, wherein the vertical tail is achieved so that the ratio between the control surface local chord and the vertical stabilizer local chord allows a local value of the side lift coefficient being either constant, lower than or equal to the maximum acceptable value, along the height of the vertical tail, between the root and a given height of the vertical stabilizer, and a decreasing local value of the side lift coefficient between the given height of the vertical stabilizer and the tip.

6. The method according to claim 5, applied to a generally trapezoid-shaped vertical tail having a rectilinear trailing edge of the control surface and a hinge axis and for which the ratio between the control surface local chord and the vertical stabilizer local chord is constant, wherein the trailing edge of the control surface is arranged so as to have a concave curved shape and the hinge axis is pivoted in a given position, by an angle oriented so as to increase the ratio between the control surface local chord and the vertical stabilizer local chord in the vicinity of the root and to decrease the ratio between the control surface local chord and the vertical stabilizer local chord in the vicinity of the tip.

7. The method according to claim 1, wherein the control surface is pivoted around the hinge axis by an angle ranging between 0 and 45° relatively to the vertical stabilizer.

8. A vertical tail comprising:

a vertical stabilizer and a control surface able to pivot with respect to said stabilizer about a hinge axis;

the ratio between a control surface local chord and a vertical stabilizer local chord being varied as a function of a height of the vertical tail so as to bring a local value of the side lift coefficient applied to the vertical tail closer to a maximum acceptable value, the control surface local chord being the distance between a trailing edge of the control surface and the hinge axis and the vertical stabilizer local chord being the distance between the hinge axis and a leading edge of the vertical stabilizer, wherein the maximum acceptable value of the side lift coefficient is the value beyond which, for a given angle between the control surface and the vertical stabilizer, a detachment of the aerodynamic flow is observed on the surface of the vertical tail.

9. An aircraft comprising a vertical tail according to claim 8.

* * * * *